Patented Feb. 1, 1949

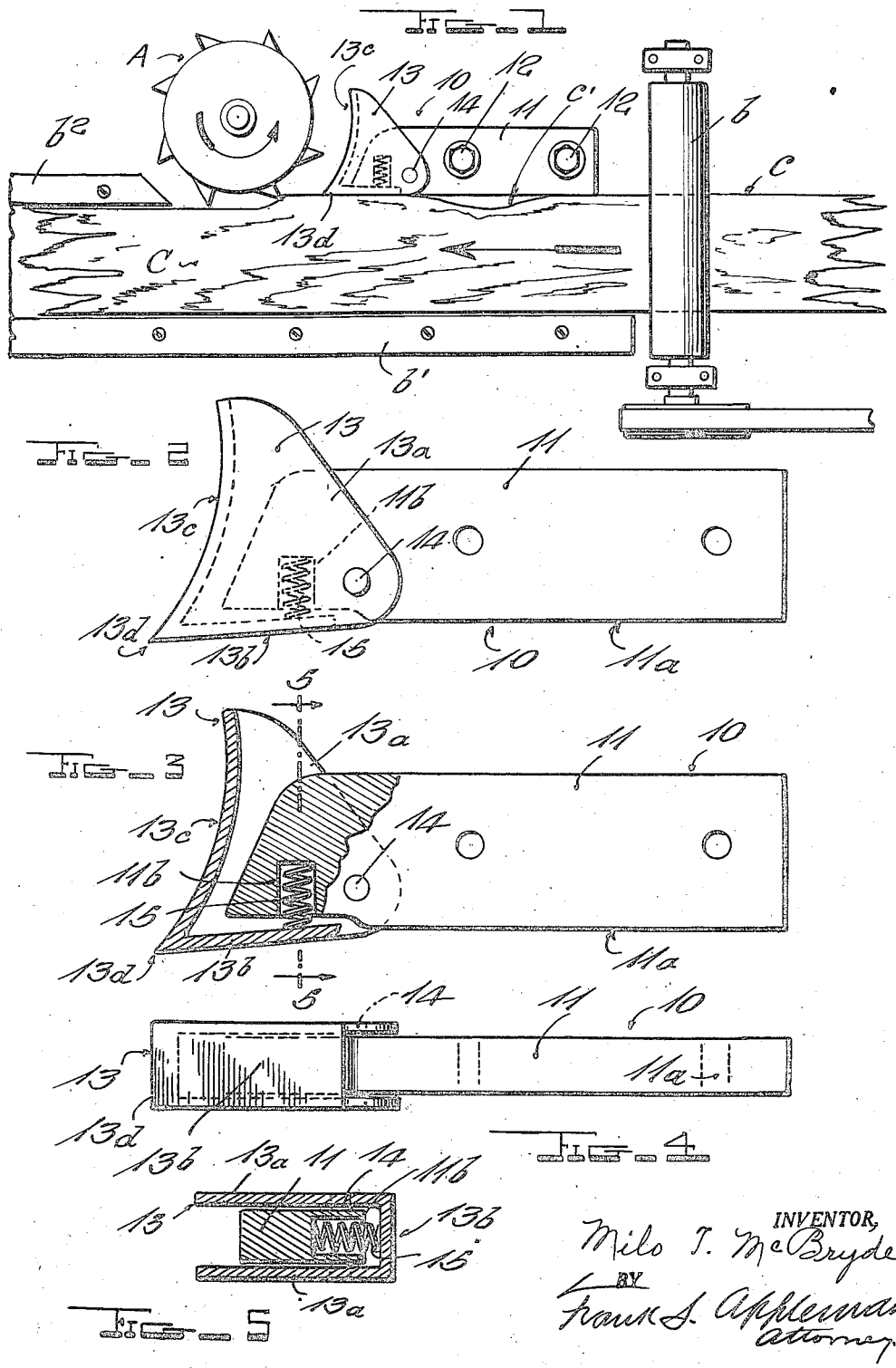

2,460,465

UNITED STATES PATENT OFFICE 2,460,465

INSIDE SIDEHEAD CHIP BREAKER

Milo Thomas McBryde, Arkadelphia, Ark.

Application February 17, 1947, Serial No. 728,995

1 Claim. (Cl. 144—243)

This invention relates to improvements in planing machine assemblies and more particularly to mechanism employed in connection therewith designed to provide for "chip breaker" activities.

Various forms and types of planing machines are in service, these including machines designed to cut or plane the side edges of lumber being operated upon by the machine; such machine generally utilizes a side head cutter rotating on a vertical axis for producing the planing or cutting action on the work side edge, the head generally traveling in a direction such that its cutters move in a circular path in direction opposite the direction of advance of the work. The machine generally carries a guide leading up to and in proximity to the cutting point, the end of the guide being shaped to permit the free travel of the cutting teeth, the nose end of the guide forming the end of the guide adjacent such cutting path, the nose zone of the guide providing a resistance factor such that the advancing teeth are required to chip the material, thus tending to prevent splitting of the work, since the edge face of the latter is in complete contact with the guiding face of the guide. Such cutting heads are generally located on what is known as the inside of the cutting path, and in practice, provision is usually made to maintain the work in contact with such guiding face. Since the work may vary in width, provision may also be made for meeting this condition, as by providing for adjustment of the position of the cutting head and guide, if the work is of generally uniform width, or, in some cases, pressure means is applied to the opposite or outer side of the work for maintaining it in contact with the guiding face regardless of differences in width, especially in cases where the work is fed more or less promiscuously as to width, such pressure means being used in addition to the usual action of the pressure rolls tending to feed the work toward such guiding face.

Where the work has its side edge practically planar, such mechanism is generally satisfactory. Occasionally, however, the work has its side edge somewhat irregular in spots, etc., in which case the advance of the irregular "fault" zone will take place with the remainder of the work and be normally guided, until the irregular zone reaches the nose end of the guide and into the path of the cutters; when this condition begins, the contour of the irregularity will lead the exposed edge of the irregularity out of contact with the nose, so that the latter no longer is relatively positioned in such manner as to provide the efficient chip breaking action, since a space between the nose and the work edge in such zone remains unbridged until the irregular zone has actually passed such nose to restore the normal conditions. During the traversal of the irregular zone past the nose of the guide, the chip breaking action is absent, since the action of nose is lost through the fact that the edge face of the work is out of contact therewith, the result being that there is no immediate resistance opposing the pressure provided by the advancing cutting tooth as the latter passes outwardly of the work, with the result that the pressure of the tooth may tend to produce splitting characteristics of the work at such time, thus damaging the work.

The present invention is designed to mitigate such conditions of irregularity without, however, affecting the normal operation when the side edge of the work is properly planar. This result is obtained by making the guide means in the form of an assembly in which the nose zone is movable pivotally, and retained under spring tension or the like, such that the nose itself will automatically track the edge face as the work advances. Hence, the nose will be positioned in alinement with the plane of the guide face where the work carries no irregularities, and will move into the recess provided by the irregularity "fault" to preserve the contacting relation to the work face even though the latter is receded relatively to the plane of the guide face. As a result, the same action of providing the resistance to the tooth pressure will be presented by the nose whether the work edge face is planar or carries irregularities, the distinction being in connection with the cutting action itself, in that the presence of the irregularity will vary the depth of the cut. A particular advantage is present in the latter respect through the fact that variations in the depth of cut will not effect the operation, and will produce the normal chip breaking action whenever the cutting zone reaches to at least the bottom of the irregularity.

The particular construction employed is simple and efficient in operation, and readily applied, whether or not the cutting head of the planing machine is adjustable, since the assembly is capable of being mounted in such manner as to be adjustable with the head or relative thereto.

To these and other ends, the nature of which will be more clearly understood as the invention is hereinafter disclosed, said invention consists in the improved construction and combination of parts hereinafter more fully described, illustrated in the accompanying drawings, and more particularly pointed out in the appended claim.

In the accompanying drawings in which similar reference characters indicate similar parts in each of the views:

Figure 1 is a schematic plan view of so much of a simple planing machine as is included within the side head cutter zone of the machine;

Figure 2 is a plan view of the guide assembly;

Figure 3 is a similar view with parts broken away;

Figure 4 is a side elevation; and

Figure 5 is a sectional view taken on line 5—5 of Figure 3.

For the purpose of illustrating the invention in service, the same is shown as applied to a simple form of planing machine, Figure 1 illustrating diagrammatically and schematically portions of the machine in the zone occupied by the invention. In this view, A indicates the vertical side head cutter located on the inside of the travel-path of the work C, the latter being shown as a board being advanced relative to the cutter A by a feed roller b, the cutter A rotating on a vertical axis in direction opposing the direction of advance of the work. A stationary outside guide b' is shown as a convenient structure for producing the work path-way, it being understood, of course, that this guide may be of any suitable type or may be of any of the well known outside structures employed in planing machine practice. A guide $b^2$ is located beyond the cutter and serves as a guide for that portion of the work which has passed the cutting point. It will be understood, of course, that these parts, in practice, may be of any of the well known structures utilized in planing machinery, the latter including the supporting means by which these elements are carried.

The invention itself, in Fig. 1, is indicated at 10, the details of which are disclosed in the remaining figures; in this figure, it is assumed that the work normally has a planar inside edge c, but that the latter is interrupted by an irregularity indicated at c', the latter advancing, of course, as the work advances to the point where the cutting teeth are active upon the inside edge of the work, the cutter being located to be exposed for service of its teeth intermediate the rear end of the guide $b^2$ and the nose of the guide assembly constituting the invention and which is indicated in Fig. 1 as 10.

The guide assembly 10 comprises a guide 11 of suitable length and which is definitely located upon the supporting means by the use of a pair of screws 12 or equivalent structures, the arrangement being such that when the position of the guiding face 11a of the guide 11 has been determined, the guiding face 11a position remains constant through the action of screws 12. Guide face 11a is the face designated to control the advance of the work to the cutter A.

The advance end of the assembly 10 is in the form of a nose 13, this being pivotally secured to guide 11, 14 indicating a pivot point. As shown in Fig. 3, the nose has the general characteristics of a rearwardly opening shell into which the advance end of guide 11 extends, the shell having sides 13a, a bottom wall 13b, and a curved face wall 13c, walls 13b and 13c connecting the opposite side portions 13a. As shown, walls 13b and 13c intersect to produce a sharp nose 13d, wall 13b presenting a planar face, while wall 13c is curved to conform somewhat to the travel-path of the cutter teeth. Guide 11, within the zone projecting into the nose section is provided with a recess 11b positioned in advance of pivot 14, the recess opening upwardly from the lower face of the guide, the latter, if desired, being cut away to permit of its entrance within the nose section; the recess thus opposes the wall 13b of the nose section. Mounted within recess 11b is a spring 15 of suitable power, this spring having its exposed end zone contacting with the inner face of wall 13b, the spring being designed to apply pressure upon the nose section to move the latter pivotally inward in the direction of the work travel-path as indicated in Fig. 3.

While the nose configuration and the pivot point are shown in Fig. 1 as so located as to place the outer wall face of wall 13b in alinement with the guiding face 11a, it will be understood that this is simply illustrative, since it is possible for the nose section to properly operate for the desired purpose even though only the nose 13d actually contacts the edge of the work, it being possible that in some cases, it may be desirable that the outer face of wall 13b extend at a slight angle to the plane of face 11a, so that only the nose 13d would be located in such plane, and such variation from the showing of Fig. 1 is contemplated within the invention.

As is apparent from Fig. 1, the face 13c of the nose section has characteristics of the advance end of the usual guide found as the inside guide in planing machine practice, and which has somewhat of the characteristic of a stationary chip breaker, the invention thus providing for activities similar to those of the usual guide where the inside edge of the work has the planar characteristic, nose 13d being equivalent to the nose of the usual guide. A principal difference in action between the invention and the usual guide is made manifest when the inside edge is made irregular as by the presence of what may be termed a "fault," indicated illustratively at c'.

Under prior practice and with the fixed guide employed in that practice, the work would approach the cutting zone and gradually reach the path of travel of the cutting teeth. While the presence of the fault would not materially affect cutter operation, such cutter operation could, however, tend to set up conditions somewhat similar to splitting of the work; this will be understood from the following: a traveling tooth, moving in a circular path, first approaches a plane extending through zenith and nadir zones of the travel-path and then the travel-path recedes from the major cutting depth. Hence, when the end of the fault c' actually enters the tooth cutting path, this action will take place on any material which may lie within such cutting path, it being assumed that the work will travel as normally in contact with the usual guide. During the advance of the work end of the fault c', no material damage would result from the cutting action as long as the face of the fault is receding from the plane of the guide, since the continued travel of a tooth would simply cut the portion of the work which would extend through the cutting path and then pass into the space beyond the cutting point. When, however, the bottom of the fault or cavity advances to the point where the teeth begin to enter the zone beyond the point of greatest depth of the cavity—this could occur as the preceding tooth was moving in the receding portion of its path—such engagement would take place while a portion of the edge is out of contact with the guide; and since the tooth is then traveling in a direction toward the plane of the guide face, it is moving in a direction tending to cross the grain of the work, doing this in presence of the fact that a portion of the work beyond the cutting path is still unsupported by the guiding face. Under these conditions, it is apparent that the advancing tooth can apply pressure upon the material between it and the guiding face and, in the absence of the guide support, can tend to force this latter ahead of it and tend to produce the conditions of a split in the work itself, each advancing tooth providing a source of difficulty in this respect as long as any portion of the cavity or the material beyond the cavity remains out of contact with the guiding face. The splitting action is due, of course, to the fact that the immediate portion of the work which is being cut by the receding tooth is itself unsupported by the guide, etc. at such instant, a portion of the length of the work being thus free from the resistance which a guiding face is designed to give in opposition to this portion of the movement of a cutting tooth; hence, the active tooth pressure is not compelled to actually cut across the work fiber and grain as it is required to do where the edge face of the work is completely planar and the guiding face provides the needed resistance.

In contrast with this, the present invention is designed to set up the same conditions as to the action of such receding cutting tooth regardless of whether or not the edge face of the work is truly planar or carries irregularities such as indicated by the fault c'. With the true planar face side edge, the nose 13d simply rides upon the edge face, and since it is backed by the tension of spring 15, will exert sufficient pressure upon the edge face as to assure the needed resistance to force the cutting tooth to "chip off" the work material which is being removed. Where the work edge face includes a fault such as c', for instance, this action of the nose 13d is not changed, the nose 13d simply tracking the face of the fault through the pivotal movement of the nose section under the action of spring 15 so that the nose remains active as such resistance while traveling through the fault or cavity zone so that any cutting action which may take place within the limits of the zone will be subject to the same conditions as are present when the work edge face is truly planar. In other words, the nose section forces the receding teeth to remove the work in chip form whether the edge face is planar or irregular, the assembly thus serving similar the structures known colloquially as "chip breakers" with the assembly simply located to operate on the side of the work-path occupied by the inside cutter head. The action thus described will be similar whether lower face of wall 13b be arranged to aline with the guiding face as in Fig. 1, or extend at a slight angle to such guiding face.

While I have shown the assembly in connection with a simple form of planing mechanism, it will be understood that the principles of the invention and the general structures shown are applicable for use with any desired type of planing mechanism. In fact, the arrangement is such that it would be possible to provide a similar arrangement for the outside cutter head and even to locate these cutter heads on approximately the same transverse plane.

Obviously, the assembly is one that is simple structurally and readily manufactured and installed, and, as pointed out, it is especially useful in meeting one or more of the conditions which are possibilities in the planing of lumber and capable of many times saving lumber which would otherwise need to be cast aside.

While I have herein shown and described a preferred form of the invention and described several ways in which it may be used, it will be understood that changes and/or modifications therein may be found desirable or essential in meeting the various exigencies of service and/or the desires of an individual user; I therefore reserve the right to make any and all such changes and/or modifications therein as may be found desirable or essential insofar as the same may fall within the spirit and scope of the invention as expressed in the accompanying claim when broadly construed.

I claim:

In a planing machine of the type wherein a cutter is mounted for cutting the side edges of lumber moving thereby, a frame along which the lumber moves to the cutter, a guide member secured to the frame forwardly of and on the same side as the cutter and in substantially parallel relation to the side edge of the lumber, a nose element adapted to encompass the forward end of the guide, a vertical pivot connection between the nose element and the guide, said guide member being provided with a recess forwardly of the pivot connection, and spring means having one end seated in said recess while the opposite end bears against said nose element to maintain the nose element against the side edge of the lumber to follow the contour thereof as the lumber moves toward the cutter.

MILO THOMAS McBRYDE.

REFERENCES CITED

The following references are of record in the file of this patent:

UNITED STATES PATENTS

| Number | Name | Date |
|---|---|---|
| 395,495 | Hutchinson | Jan. 1, 1889 |
| 397,834 | Crafts | Feb. 12, 1889 |
| 666,898 | Graham | Jan. 29, 1901 |
| 1,292,579 | Clement, et al. | Jan. 28, 1919 |
| 2,102,186 | Nicholson, et al. | Dec. 14, 1937 |